(12) United States Patent
Watson

(10) Patent No.: US 10,350,641 B1
(45) Date of Patent: Jul. 16, 2019

(54) VACUUM SYSTEM

(71) Applicant: Bryan Chevalier Nelson Watson, Bakersfield, CA (US)

(72) Inventor: Bryan Chevalier Nelson Watson, Bakersfield, CA (US)

( * ) Notice: Subject to any disclaimer, the term of this patent is extended or adjusted under 35 U.S.C. 154(b) by 0 days.

(21) Appl. No.: 15/783,667

(22) Filed: Oct. 13, 2017

Related U.S. Application Data

(60) Provisional application No. 62/436,557, filed on Dec. 20, 2016.

(51) Int. Cl.
| | | |
|---|---|---|
| *B07B 4/08* | (2006.01) | |
| *B65G 47/91* | (2006.01) | |
| *B65G 47/34* | (2006.01) | |
| *B65G 15/28* | (2006.01) | |

(52) U.S. Cl.
CPC ............... *B07B 4/08* (2013.01); *B65G 47/34* (2013.01); *B65G 47/91* (2013.01); *B65G 15/28* (2013.01)

(58) Field of Classification Search
CPC ........ B65G 69/182; B65G 69/183; B07B 4/08
USPC ......... 406/151, 152, 153; 414/291; 209/643; 141/93
See application file for complete search history.

(56) References Cited

U.S. PATENT DOCUMENTS

| | | | | |
|---|---|---|---|---|
| 2,472,053 A | * | 5/1949 | Dorfan .............. | B65G 69/182 209/147 |
| 2,637,600 A | * | 5/1953 | Dorfan .............. | B65G 53/42 406/152 |
| 3,613,883 A | * | 10/1971 | Starbuck .............. | B07C 5/12 209/551 |
| 3,804,248 A | * | 4/1974 | Talamantz .............. | B03B 9/06 209/643 |
| 4,180,718 A | * | 12/1979 | Hanson .............. | C10G 1/00 198/952 |
| 4,318,643 A | * | 3/1982 | Larsson .............. | B65G 53/60 406/117 |
| 4,411,038 A | * | 10/1983 | Mukai .............. | B03B 4/02 15/3.13 |
| 4,652,362 A | * | 3/1987 | Mueller .............. | B03B 4/02 209/312 |
| 4,913,804 A | * | 4/1990 | Muller .............. | B03B 4/02 209/312 |
| 4,923,363 A | * | 5/1990 | DiFrank .............. | B65G 47/91 198/428 |
| 4,929,342 A | * | 5/1990 | Johnston .............. | B03B 9/061 209/137 |
| 5,070,991 A | * | 12/1991 | Hinchcliffe .............. | B65B 19/105 198/418.3 |

(Continued)

*Primary Examiner* — Joseph A Dillon, Jr.
(74) *Attorney, Agent, or Firm* — Plager Schack LLP; Mark H. Plager; Michael J. O'Brien

(57) ABSTRACT

A vacuum system is configured to segregate debris on a conveyor belt. The vacuum system includes a manifold further comprising a manifold body joined to a first end wing and a second end wing. The manifold body further includes a tube slot opening joined to a tube slot. A vacuum tube adapter is joined to the tube slot. A vacuum tube adapter flared portion is arranged on the vacuum tube adapter. The vacuum tube adapter flared portion is adapted to receive a flexible vacuum intake hose. A first end flap further includes a first end flap central opening, and joined the first end wing. A second end flap further includes a second end flap central opening, and joined the second end wing.

4 Claims, 3 Drawing Sheets

(56) References Cited

U.S. PATENT DOCUMENTS

| | | | | |
|---|---|---|---|---|
| 5,242,059 A * | 9/1993 | Low | ............. | B07C 5/362 |
| | | | | 198/370.12 |
| 5,480,034 A * | 1/1996 | Kobayashi | ............. | B07B 1/155 |
| | | | | 209/667 |
| 5,566,813 A * | 10/1996 | Thomas | ............. | B07C 3/02 |
| | | | | 198/495 |
| 5,669,741 A * | 9/1997 | Ono | ............. | B65G 45/26 |
| | | | | 406/79 |
| 6,176,368 B1 * | 1/2001 | Bradbury | ............. | B01D 45/02 |
| | | | | 198/860.3 |
| 6,206,175 B1 * | 3/2001 | Tschantz | ............. | B65G 45/22 |
| | | | | 198/493 |
| 6,257,816 B1 * | 7/2001 | Frich | ............. | B42C 19/00 |
| | | | | 198/689.1 |
| 6,502,689 B2 * | 1/2003 | Mitchell | ............. | B65G 19/14 |
| | | | | 198/550.8 |
| 7,243,801 B2 * | 7/2007 | Posner | ............. | B07B 4/08 |
| | | | | 198/818 |
| 8,123,023 B2 * | 2/2012 | Williams | ............. | B41J 11/0035 |
| | | | | 198/689.1 |
| 8,517,177 B2 * | 8/2013 | Graham | ............. | B03B 9/061 |
| | | | | 209/12.1 |
| 8,967,919 B2 * | 3/2015 | Yaluris | ............. | C10G 11/18 |
| | | | | 406/50 |
| 9,764,359 B2 * | 9/2017 | Cappozzo | ............. | B07B 1/15 |
| 2010/0150691 A1 * | 6/2010 | Harris | ............. | B65G 67/42 |
| | | | | 414/291 |
| 2010/0243538 A1 * | 9/2010 | Uebayashi | ............. | B07B 1/34 |
| | | | | 209/26 |
| 2015/0110565 A1 * | 4/2015 | Harris | ............. | B65G 53/34 |
| | | | | 406/144 |
| 2017/0247209 A1 * | 8/2017 | Oren | ............. | B65G 15/00 |

* cited by examiner

VACUUM SYSTEM

RELATED APPLICATION

This application claims priority to provisional patent application U.S. Ser. No. 62/436,557 filed on Dec. 20, 2016, the entire contents of which is herein incorporated by reference.

BACKGROUND

The embodiments herein relate generally to segregating debris from aggregate processing equipment. Other endeavors in this field include: U.S. Pat. No. 7,243,801 issued to Posner and U.S. Patent Application Pre-grant Publication 2016/0151884 filed by Bernard.

Prior to embodiments of the disclosed invention, trash, wood, plastic and petromat contaminated mainly recycled products that would have to be hand removed from a conveyer, which is very time consuming and labor intensive. Embodiments of the disclosed invention solve this problem.

SUMMARY

A vacuum system is configured to segregate debris on a conveyor belt. The vacuum system includes a manifold further comprising a manifold body joined to a first end wing and a second end wing. The manifold body further includes a tube slot opening joined to a tube slot. A vacuum tube adapter is joined to the tube slot. A vacuum tube adapter flared portion is arranged on the vacuum tube adapter. The vacuum tube adapter flared portion is adapted to receive a flexible vacuum intake hose. A first end flap further includes a first end flap central opening, and joined the first end wing. A second end flap further includes a second end flap central opening, and joined the second end wing.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
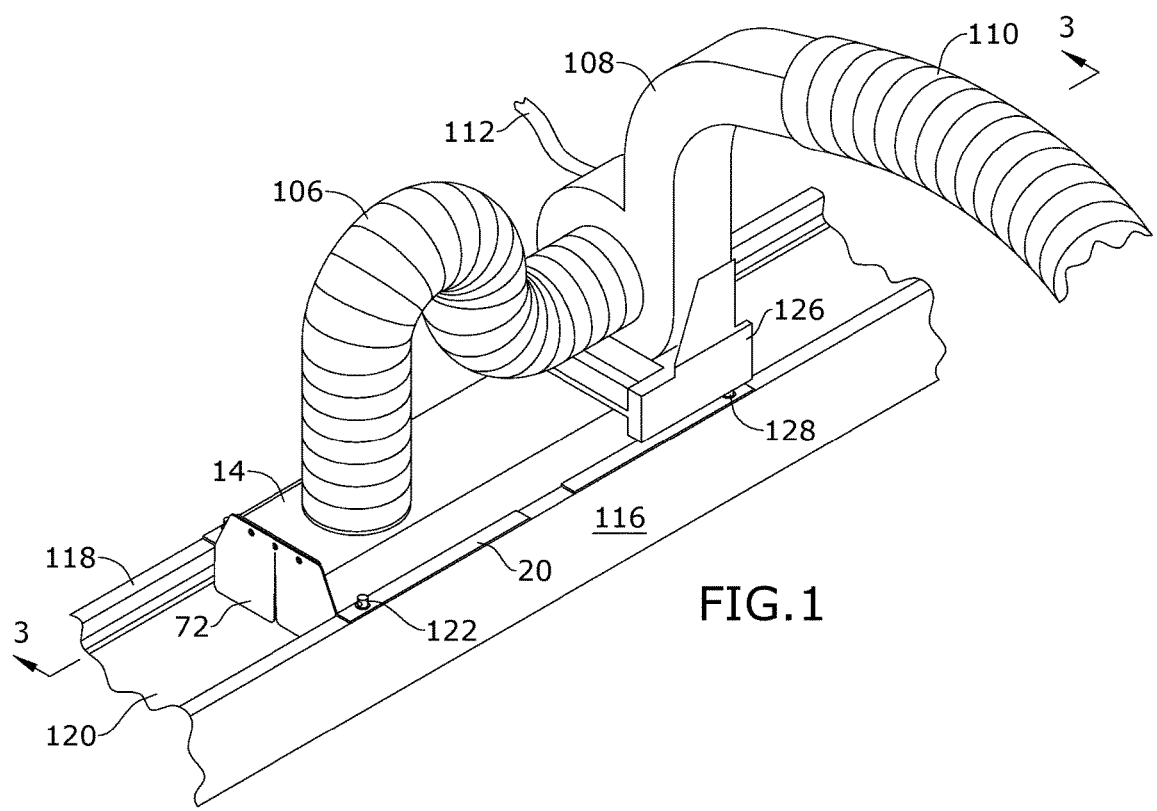
FIG. 1 shows a perspective view of one embodiment of the present invention.
Figure 2:
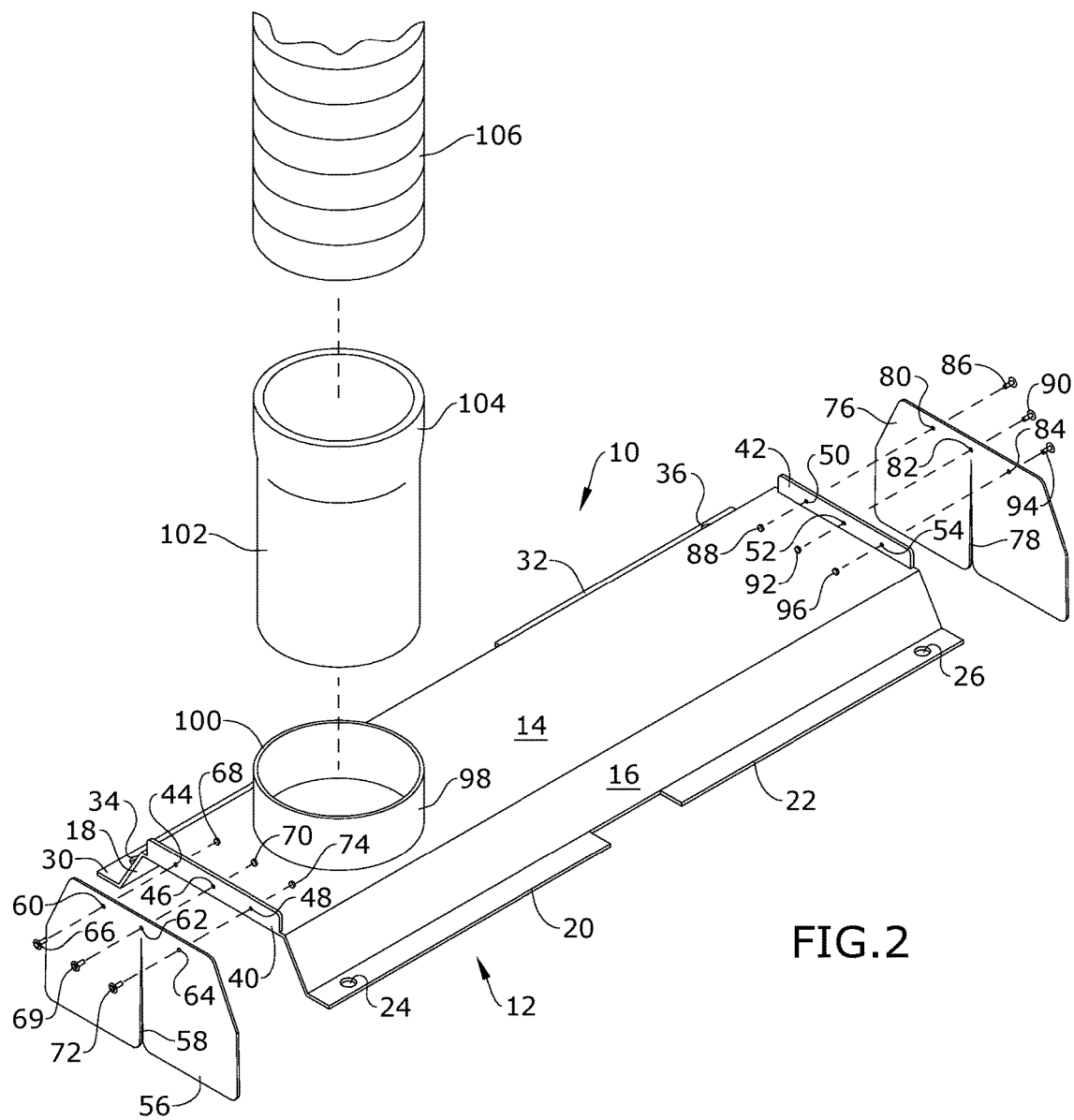
FIG. 2 shows an assembly view of one embodiment of the present invention.
Figure 3:
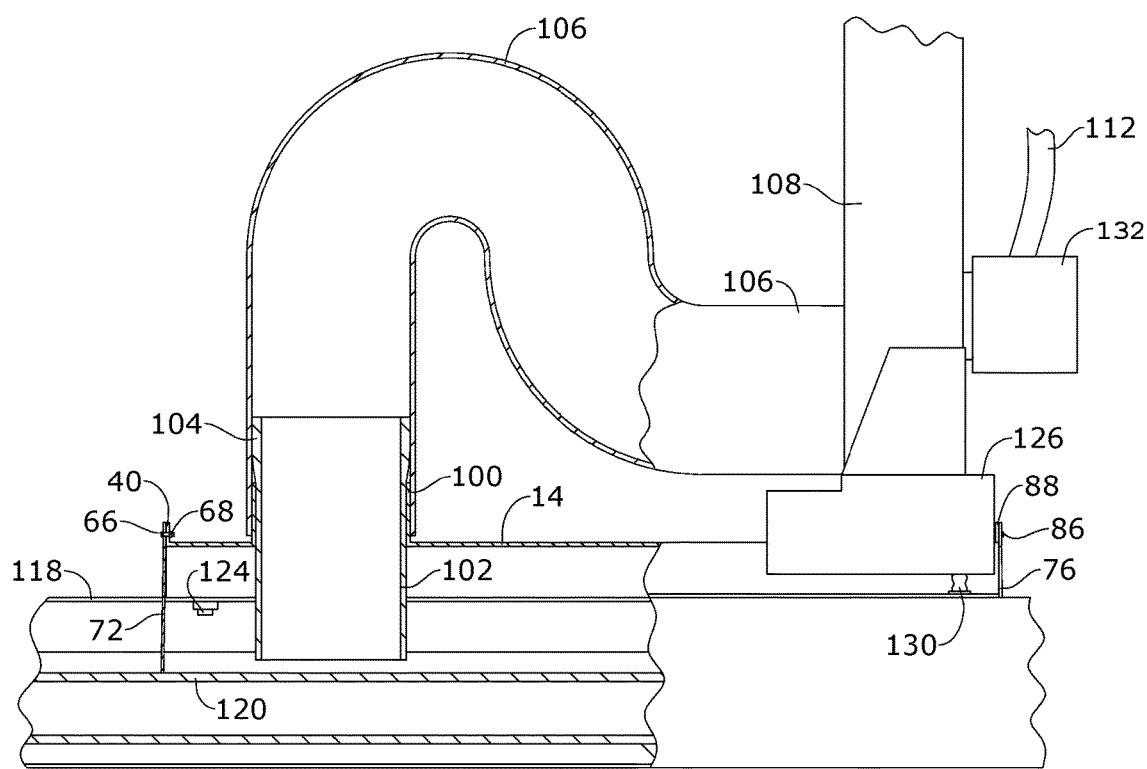
FIG. 3 shows a section view of one embodiment of the present invention taken along line 3-3 in FIG. 1.

By way of example, and referring to FIGS. 1-3, one embodiment of a vacuum system 10 further comprises a manifold 12. The manifold 12 further comprises a manifold body 14. The manifold body 14 further comprises a first side section 16 and a second side section 18.

The first side section 16 is attached to a first side section first wing 20 and a first side section second wing 22. The first side section first wing 20 further comprises a first side section first wing attachment hole 24. The first side section second wing 22 further comprises a first side section second wing attachment hole 26.

The second side section 18 is attached to a second side section first wing 30 and a second side section second wing 32. The second side section first wing 30 further comprises a second side section first wing attachment hole 34. The second side section second wing 32 further comprises a second side section second wing attachment hole 36.

The manifold body 14 further comprises a first end wing 40 and a second end wing 42. The first end wing 40 further comprises a first end wing first fastener hole 44, a first end wing second fastener hole 46, and a first end wing third fastener hole 48. The second end wing 42 further comprises a second end wing first fastener hole 50, a second end wing second fastener hole 52, and a second end wing third fastener hole 54.

A first end flap 56 further comprises a first end flap central opening 58, a first end flap first fastener hole 60, a first end flap second fastener hole 62, and a first end flap third fastener hole 64. A first end first fastener 66 is inserted through the first end flap first fastener hole 60 and the first end wing first fastener hole 44 and then joined with a first end first nut 68. A first end second fastener 68 is inserted through the first end flap second fastener hole 62 and the first end wing second fastener hole 46 and then joined with a first end second nut 70. A first end third fastener 72 is inserted through the first end flap third fastener hole 64 and the first end wing third fastener hole 48 and then joined with a first end third nut 74.

A second end flap 76 further comprises a second end flap central opening 58, a second end flap first fastener hole 80, a second end flap second fastener hole 82, and a second end flap third fastener hole 84. A second end first fastener 86 is inserted through the second end flap first fastener hole 80 and the second end wing first fastener hole 50 and then joined with a second end first nut 88. A second end second fastener 90 is inserted through the second end flap second fastener hole 82 and the second end wing second fastener hole 52 and then joined with a second end second nut 92. A second end third fastener 94 is inserted through the second end flap third fastener hole 84 and the second end wing third fastener hole 54 and then joined with a second end third nut 96.

The manifold body 14 further comprises a tube slot opening 98 joined to a tube slot 100. The tube slot 100 is joined to a vacuum tube adapter 102 that further comprises a vacuum tube adapter flared portion 104. The vacuum tube adapter flared portion 104 can be joined to a flexible vacuum intake hose 106.

The flexible vacuum intake hose 106 is connected to a vacuum 108. The vacuum 108 is connected to a flexible vacuum exhaust hose 110 and a motor line 112.

A conveyor system 114 further comprises a first conveyor wall 116 and a second conveyor wall 118 with a conveyor belt 120 therebetween. The first side section first wing 20 is joined to the first conveyor wall 116 with a first conveyor wall fastener 122. The second side section first wing 30 is joined to the second conveyor wall 118 with a second conveyor wall fastener 124.

A vacuum bracket 126 is joined to the first conveyor wall 116 and the first side section second wing 22 with a first vacuum bracket fastener 128. The vacuum bracket 126 is joined to the second conveyor wall 118 and the second side section second wing 32 with a second vacuum bracket fastener 130. The vacuum 108 rests in the vacuum bracket 126.

In some embodiments, the vacuum 108 can be powered with a motor 132. In some embodiments, the motor 132 can be attached to the motor line 112.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A vacuum system, configured to segregate debris on a conveyor belt; the vacuum system comprising:
   a vacuum having a vacuum mounting bracket;
   a manifold further comprising a manifold body joined to a first end wing and a second end wing; wherein the vacuum is adjoined to the manifold through the vacuum mounting bracket; the manifold body further comprises:
   a tube slot opening joined to a tube slot;
   a vacuum tube adapter, joined to the tube slot;
   a vacuum tube adapter flared portion, arranged on the vacuum tube adapter; wherein the vacuum tube adapter flared portion is adapted to receive a flexible vacuum intake hose; wherein the flexible intake hose is adjoined to the vacuum;
   a first end flap further comprising a first end flap central opening, and joined the first end wing;
   a second end flap further comprising a second end flap central opening, and joined the second end wing.

2. The vacuum system of claim 1, wherein the manifold further comprises:
   a first side section and a second side section;
   the first side section is attached to a first side section first wing and a first side section second wing; and
   the second side section is attached to a second side section first wing and a second side section second wing.

3. The vacuum system of claim 2, further comprising: a conveyor system that further comprises a first conveyor wall and a second conveyor wall with the conveyor belt therebetween.

4. The vacuum system of claim 3, further comprising:
   a first conveyor wall fastener, joined to the first conveyor wall and the first side section first wing; and
   a second conveyor wall fastener, joined to the second conveyor wall and the second side section first wing.

* * * * *